Dec. 22, 1936.　　　T. E. HEPPENSTALL　　　2,065,133
SHELVING
Filed July 5, 1933　　　9 Sheets-Sheet 1

INVENTOR
Thomas E. Heppenstall
BY
G. Wright Arnold
ATTORNEY

Dec. 22, 1936.  T. E. HEPPENSTALL  2,065,133
SHELVING
Filed July 5, 1933  9 Sheets-Sheet 2

INVENTOR
Thomas E. Heppenstall
BY
G. Wright Arnold
ATTORNEY

Dec. 22, 1936.     T. E. HEPPENSTALL     2,065,133
SHELVING
Filed July 5, 1935     9 Sheets-Sheet 3

INVENTOR
Thomas E. Heppenstall
BY
G. Wright Arnold
ATTORNEY

Dec. 22, 1936.     T. E. HEPPENSTALL     2,065,133
SHELVING
Filed July 5, 1933     9 Sheets-Sheet 4

INVENTOR
Thomas E. Heppenstall
BY
G. Wright Arnold
ATTORNEY

Dec. 22, 1936.  T. E. HEPPENSTALL  2,065,133
SHELVING
Filed July 5, 1933  9 Sheets-Sheet 5
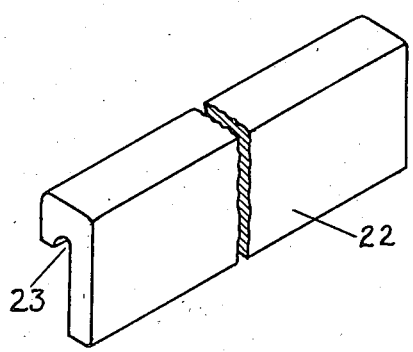
FIG. 15
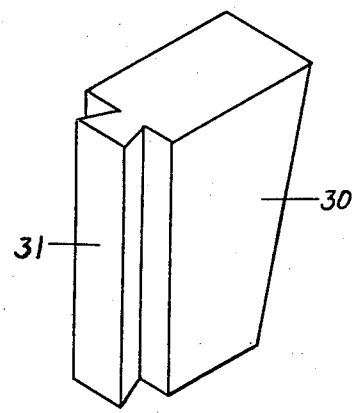
FIG. 16
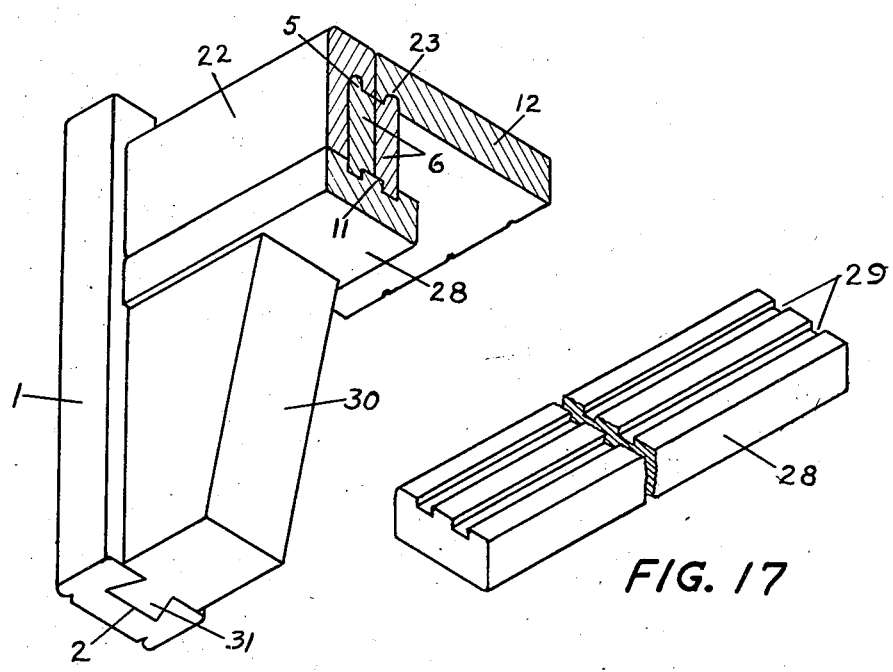
FIG. 17
FIG. 18
INVENTOR
*Thomas E. Heppenstall*
BY
*G. Wright Arnold*
ATTORNEY Dec. 22, 1936.   T. E. HEPPENSTALL   2,065,133
SHELVING
Filed July 5, 1935   9 Sheets-Sheet 6

INVENTOR
Thomas E. Heppenstall
BY
G. Wright Arnold
ATTORNEY

Dec. 22, 1936. T. E. HEPPENSTALL 2,065,133
SHELVING
Filed July 5, 1933 9 Sheets-Sheet 7

INVENTOR
Thomas E. Heppenstall
BY
A. Wright Arnold
ATTORNEY

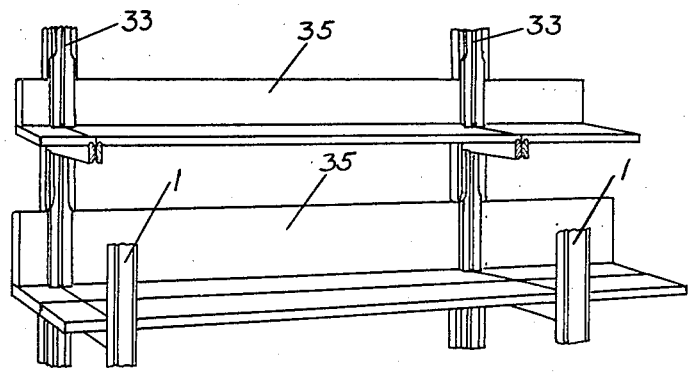
FIG. 26
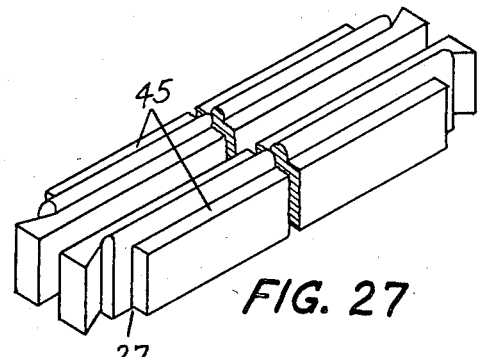
FIG. 27
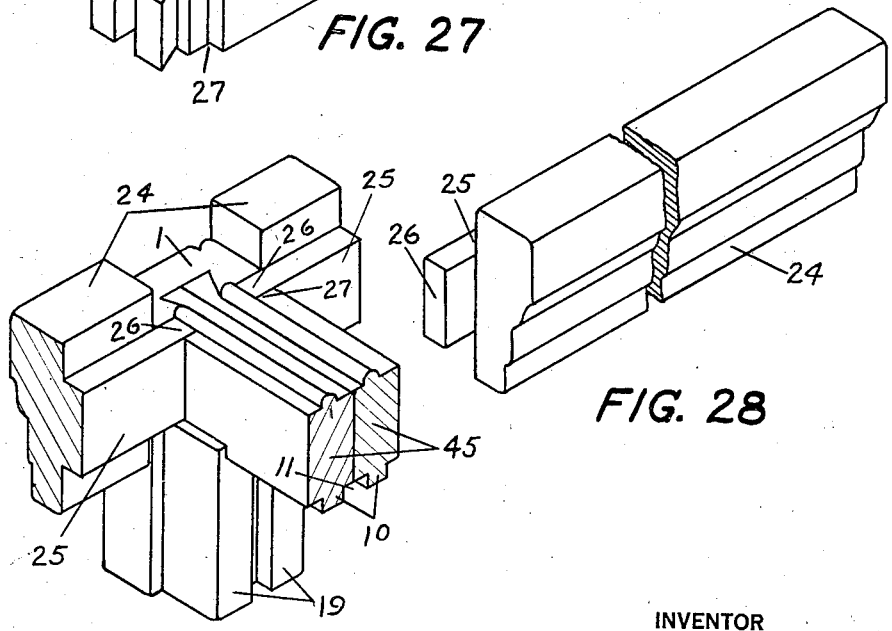
FIG. 28
FIG. 29

Dec. 22, 1936.   T. E. HEPPENSTALL   2,065,133
SHELVING
Filed July 5, 1935   9 Sheets-Sheet 9

INVENTOR
Thomas E. Heppenstall
BY
J. Wright Arnold
ATTORNEY

Patented Dec. 22, 1936

2,065,133

UNITED STATES PATENT OFFICE 2,065,133

SHELVING

Thomas E. Heppenstall, Longview, Wash.

Application July 5, 1933, Serial No. 679,013

10 Claims. (Cl. 211—148)

My invention relates to wooden shelving. More particularly, my invention relates to providing wooden shelving parts so designed that they may be fabricated or assembled to provide wooden shelving of varying models and of varying capacity. Furthermore, my wooden shelving parts are so designed that they may be assembled without the use of nails or glue, and may be disassembled without injury to such wooden shelving parts.

Shelving as constructed heretofore, and as commonly used for the most part is (first) either of a wholly built in type, or (second) of a sectional type, or (third) it is made up of manufactured parts which are partially assembled before leaving the factory. In the instance where it is built in, this involves upon moving, extensive injury and waste, and a practical reconstruction to make the same fit in a new location. To the sectional type of shelving, the objection is that it is of a definite width, depth and height. Obviously, such construction does not lend itself to ready adaptation to change of size, but such different sizes must be specially ordered. Furthermore, such shelving is very expensive. As to the third type of shelving, this comes in partially assembled condition, having metal brackets or fastening means. This involves much higher freight rates than where the parts are wholly unassembled. Furthermore, such third type has not been of a construction which permits change of style or change of width, depth or height.

Furthermore a primary object of my invention is to provide a shelving of a construction which may be assembled by an inexperienced person, no special skill being required.

The object of my invention is to provide shelving which is shipped from the factory in individual pieces and to be assembled or fabricated by the purchaser, without the use of any nails, fastening means, glue or tools. The shelving embodying my invention is characterized also by the fact that it may be disassembled without injury thereto, or may be moved to a different building, or its location changed in the same building, without injury to any of the parts. This is highly important, particularly in the instance of chain grocery stores, where extensive moving from one location to another occurs, incident to expiring leases or seeking better locations. In a district having some twenty-five hundred stores, the location of as many as three hundred stores is changed annually.

A further object of my invention is to provide a shelving of a construction of which the individual units are standard parts whereby the style of the shelving may be altered or the width of the shelves widened or narrowed, or the length of the shelving increased or decreased.

The object of my invention is to provide for shelving which may be of a style which rests on pedestals, or to extend fully to the floor, or of a skeleton type or of a closed-in type so as to form a cabinet closed—backs, sides, and front—the front being provided with or without doors, also a ledge or counter type or model. Also to provide for plain shelving or shelving with molding adornments.

The above mentioned general objects of my invention, together with others inherent in the same, are attained by the devices illustrated in the following drawings, the same being preferred exemplary forms of embodiment of my invention, throughout which drawings like reference numerals indicate like parts:

Fig. 15 is a view in perspective of a shelf end trimming member;

Fig. 16 is a view in perspective of a pedestal member;

Fig. 17 is a view in perspective of a base block;

Fig. 18 is an enlarged fragmentary view in perspective showing the assembly of the upright, pedestal, base block, spreader and trim and shelf board members;

Fig. 26 is a fragmentary view in perspective showing further assembly of the modified form of spacer member and bin board members;

Fig. 27 is a view in perspective of a modified form of spreader member with end recesses or notches to retain trimming members;

Fig. 28 is a view in perspective of one form of the front trim member;

Fig. 29 is a fragmentary enlarged view of the assembly of the front trim member, spreader member, upright and spacer members;

Figure 34:
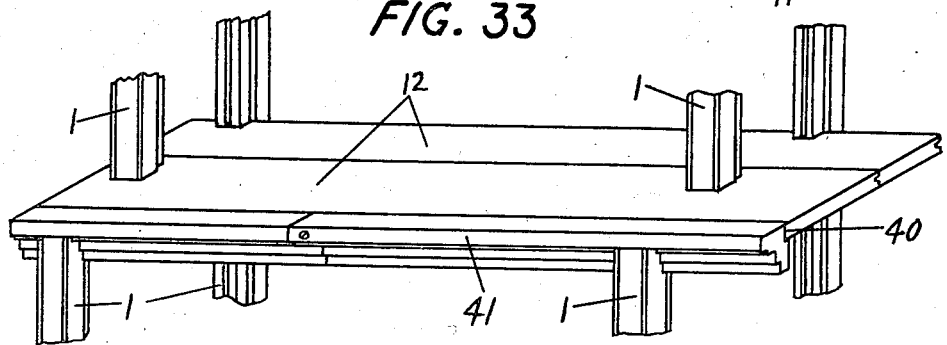

And Fig. 34 is a fragmentary view in perspective of a modified form of shelving, i. e., of the ledge type, embodying my invention.

Figure 3:
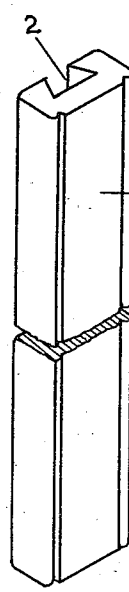
Fig. 3 is a view in perspective of an upright member of the shelving embodying my invention.

The shelving embodying my invention involves the upright member 1 having the retaining groove 2 (Fig. 3). A spreader member 3 (Fig. 2) is formed with a tongue 4 at each end of said spreader. Said tongue is of a dove-tail or V type, so as to be receivable by the groove 2 of the upright 1. The spreader member 3 has a longitudinal tongue 5 disposed along each side of the upper edge, and is preferably provided with a notch 8 for purposes hereinafter set forth.

Figures 2, 4:
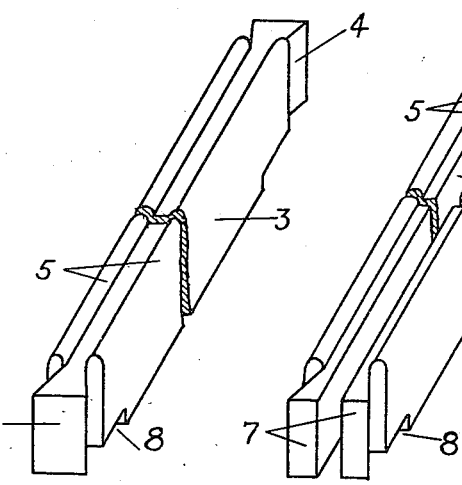
Fig. 2 is a view in perspective of a spreader member of the shelving embodying my invention.
Fig. 4 is a view in perspective of a modified form of a spreader member of the shelving embodying my invention.
Figure 8:
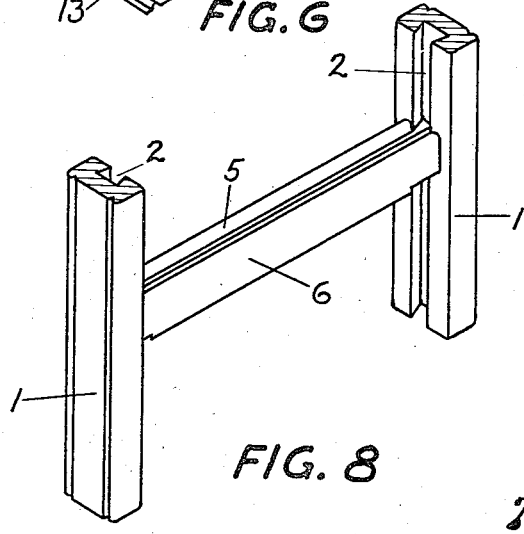
Fig. 8 is a view in perspective of two upright members and spreader members in assembled relation.
Figure 7:
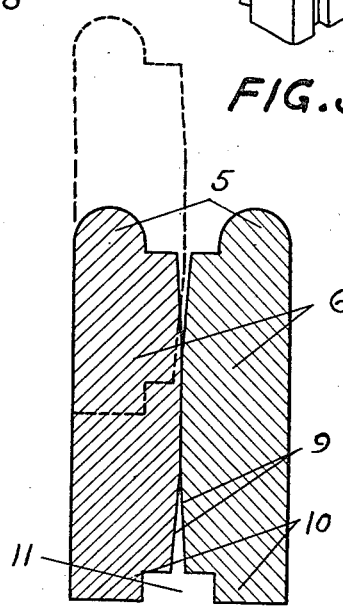
Fig. 7 is a view in cross-section of the modified form of spreader shown in Fig. 4.

A modified form of spreader is shown in Fig. 4, which is formed of two or paired parts 6, each being of identically the same construction as the other. Each part is provided with a tongue 7 at each end portion and a longitudinal tongue 5 along the upper edge portion. This modified form is likewise preferably provided with the notch 8 for purposes hereinafter set forth. The upright member 1 and spreader parts 6 in assembled form are shown in Fig. 8. The spreader member parts 6 are preferably provided with convex-like abutting faces 9 (Fig. 7). By having the spreader members in two parts it is manifest that the positioning of the same is greatly facilitated, as will appear by reference to Fig. 11, wherein it will be seen that each member 6 may be assembled with the uprights 1 by separately placing the end tongue portions of each of the spreader parts in the respective grooves of the upright members at an angle to the horizontal, and then shoving the part into horizontal position. Thus, by having the faces 9 of convex-like form makes it possible to have a locking-like tightness between the two members when in assembled position (Fig. 8), and by having the spreader element or member in two parts, it is not necessary in assembling with the uprights to start the said spreader member from the top of the upright. The parts 6 may be inserted at any desired point by simply inclining to the horizontal and thus avoid having to slide the spreader from the top of the upright.

Figure 1:
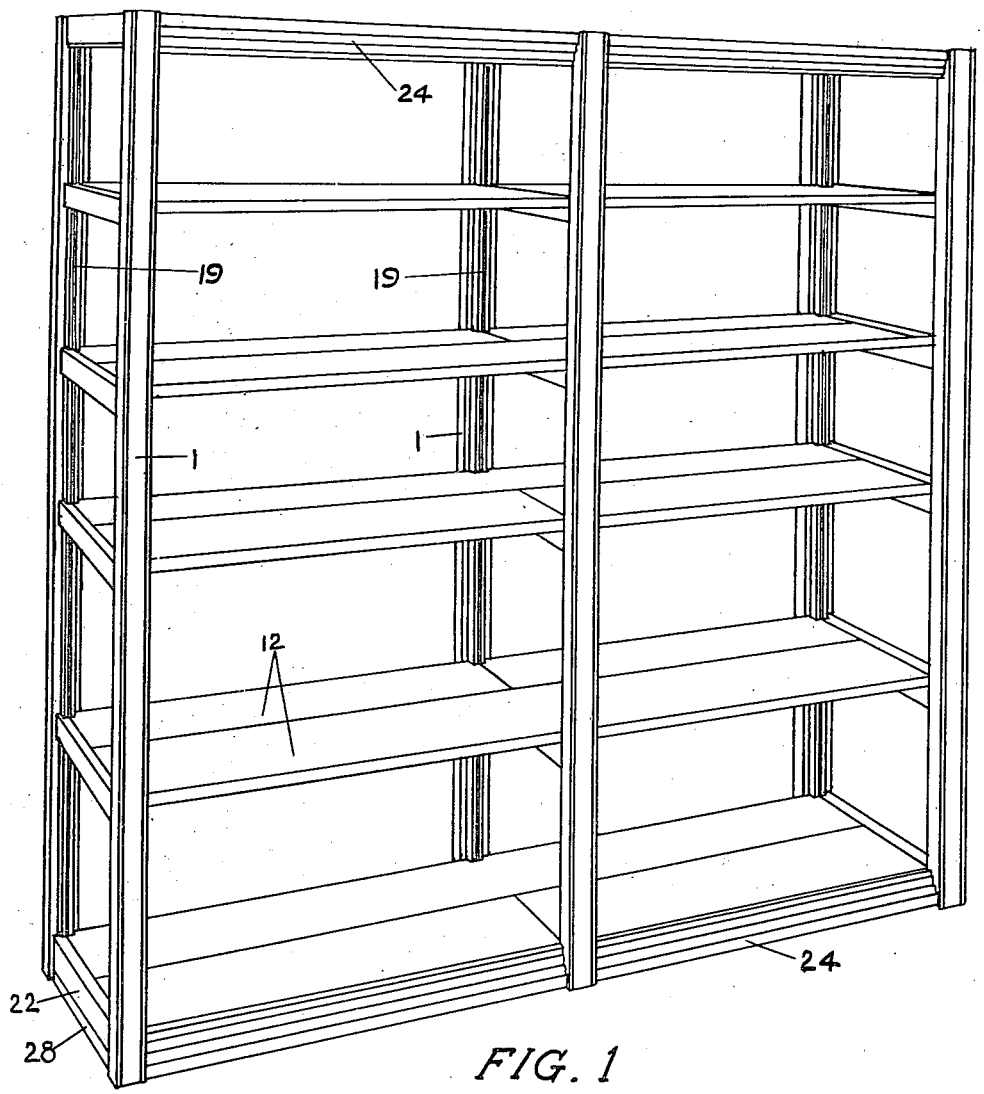
Figure 1 is a view in perspective of shelving having two sections which shelving embodies my invention.
Figure 6:
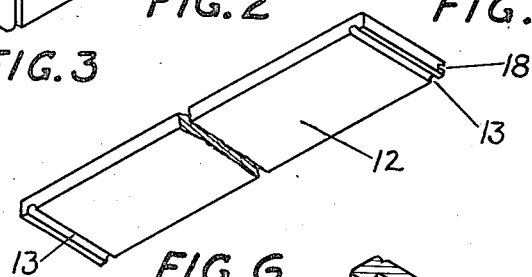
Fig. 6 is a view in perspective of a shelf member of the shelving embodying my invention.
Figure 9:
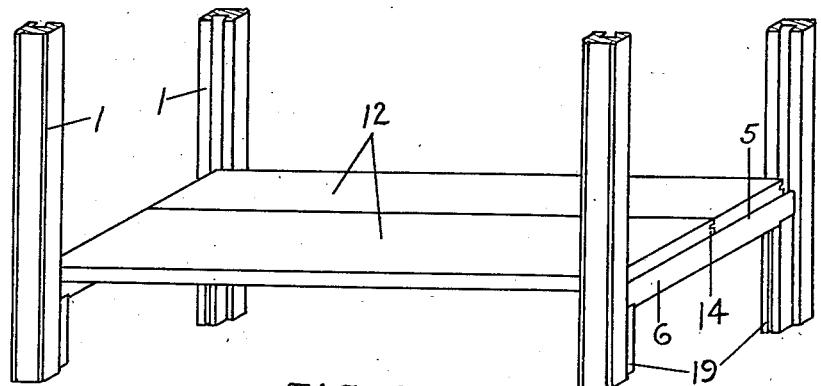
Fig. 9 is a view in perspective showing the next step in the assembly of my invention, i. e., showing the assembly units of Fig. 8 joined by the shelf boards or shelf members.
Figure 12:
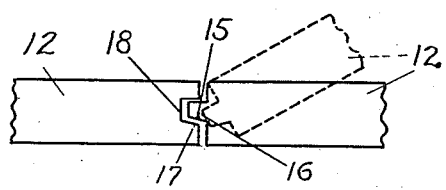
Fig. 12 is a view in detail of the angularly disposed tongue and groove parts of the shelf members.

The spreader member of modified form is preferably provided with tongue members 10 (Fig. 7) forming a groove 11 therebetween for purposes hereinafter described. These tongue members and grooves also may be of the form shown in Fig. 29. The shelf member or board 12 (Figs. 6 and 19) has a transversely disposed groove 13 on the underside in each end portion disposed to engage one of the longitudinal tongues 5 of the spreader. One, two, or more of these boards 12 may be employed to form the desired depth of the shelving. They may be of a length equal to a single section (Fig. 9) or they may be of a double section length (Figure 1). These shelf members 12 may be provided with tongue and groove along their abutting edges, as at 14 (Fig. 9). The lower contacting surfaces of the tongue and groove are preferably angularly disposed with respect to the faces of the board members to facilitate the assembly of the shelf boards between the uprights (Fig. 12), where the face 15 of the tongue 16 and the face 17 of the groove 18 are angularly disposed to permit the said shelf members being individually assembled by being dropped from above downwardly.

Figure 5:
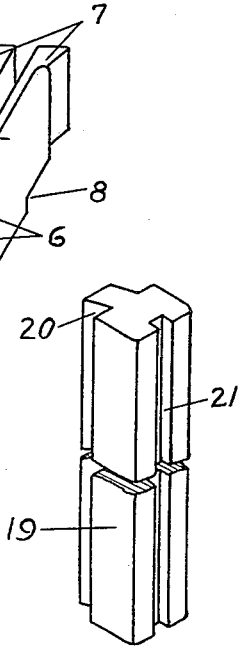
Fig. 5 is a view in perspective of a spacer member of the shelving embodying my invention.
Figure 13:
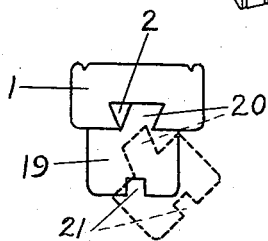
Fig. 13 is a view in detail showing the assembly of the upright member and the spacer member, the latter having an angularly disposed tongue.

Another element or member of the shelving embodying my invention consists of the spacer 19 (Fig. 5) having a longitudinal tongue 20 disposed on one face of the same, and preferably a groove 21 on the opposite side. The tongue 20 is preferably angularly disposed to facilitate assembling the said spacer with the upright 1 (Fig. 13). The spacer is of a length to provide the desired height or spacing between the shelving. By having the tongue angularly disposed cross-sectionally considered of the spacer, it is manifest that the tongue 20 of the spacer 19 may be positioned in the groove 2 of the upright by a twisting movement, as shown in Fig. 13, rather than by sliding the said spacer member from the top down extended lengths of the upright. The angularly disposed tongue member 20 prevents the spacer from falling out of position during assembly and previous to adding other parts thereupon which parts, when subsequently added, hold the same in position.

Figure 10:
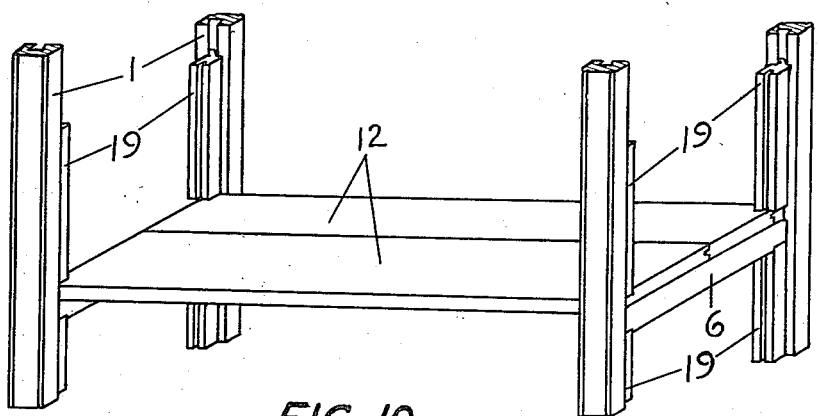
Fig. 10 is a view in perspective of the assembly of Fig. 9 with the spacer members added.
Figure 14:
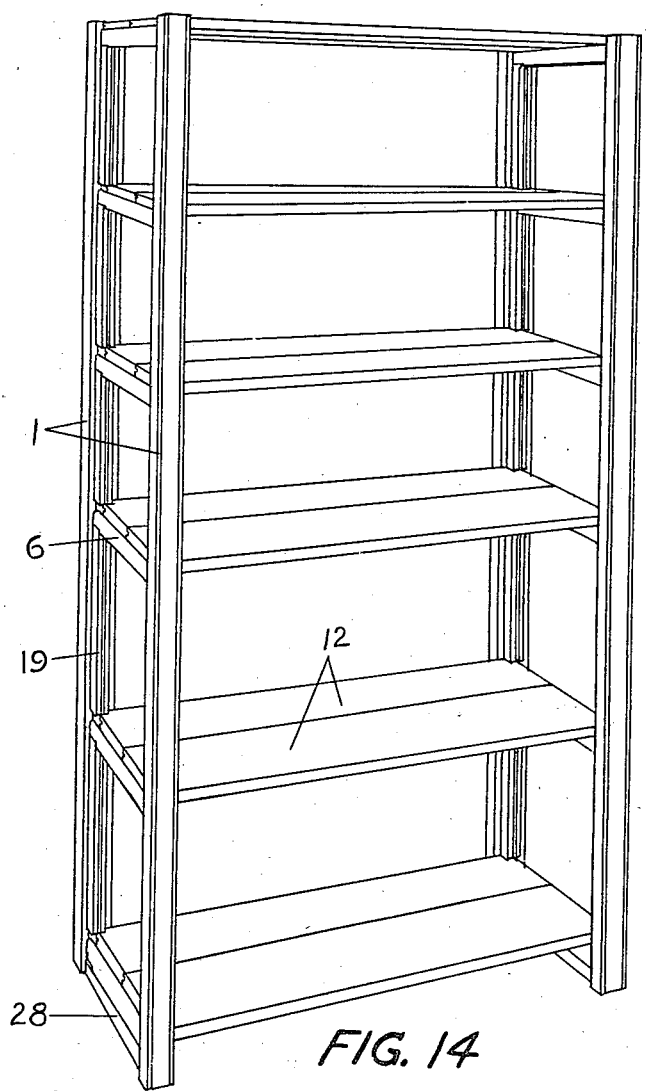
Fig. 14 is a view in perspective of the shelving embodying my invention of one section length and without trimming members.

In assembling these primary parts, two uprights 1 (Fig. 8) are joined together by the spreader parts 6—for purposes of illustration herein, the preferred form of spreader will be employed. A second pair of uprights are similarly united by the spreader; next, the shelf boards 12 would be positioned with the groove 13 engaging the tongue 5 of the spreader (Fig. 19), thus, the shelving as appears in Fig. 9 is formed; next, the spacer members 19 would be positioned (Fig. 10); then, other spreader members 6 (Fig. 11) will be positioned on top of the spacers 19; next, the shelf members 12 would be positioned on top of the last named spreaders in a manner as previously described, and so on up with the various shelves of the device, until the desired number are assembled, as illustrated in Fig. 14.

For matters of appearance, an end trimming member 22 (Fig. 15) of inverted J form cross sectionally considered, having a recess 23 may be applied adjacent the end of the shelf members 12 (Fig. 18) by causing the recess 23 to engage longitudinal tongue 5 of the spreader part 6. This, of course, would be applied to the end portion of each said shelf installation as is manifest in Figure 1 to afford a finished appearance.

Figures 30, 31, 32:
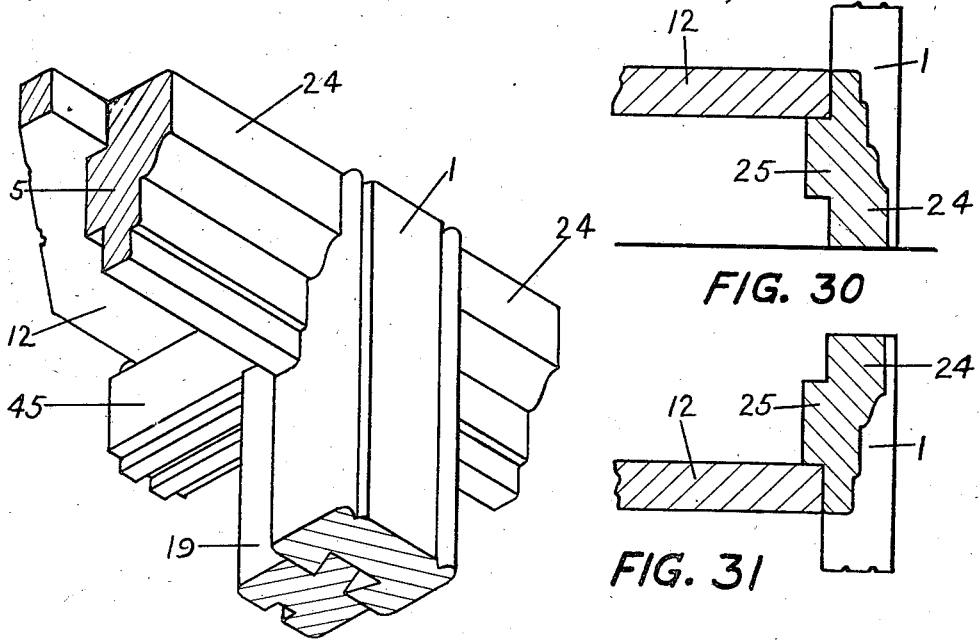
Fig. 30 is a view in section showing assembly of front trim, shelf board, and upright members at the base of the shelving embodying my invention.
Fig. 31 is a view in section showing assembly of front trim, shelf board, and upright members at the top of the shelving embodying my invention.
Fig. 32 is an enlarged fragmentary view in perspective of the assembly of the front trim member, upright, spacer, spreader, and shelf board members.

A front trimming 24 (Fig. 28) is provided with a longitudinal rib 25 disposed centrally on the rear side of the molding, having end tongues 26 projecting beyond the end of the trimmer body proper. These are installed in position by causing the said tongues 26 to engage the rear side of the upright member 1 (Fig. 29). At the top of the shelving the tongue 26 may be disposed on top of the spacer 19 and the rib 25 disposed on top of board 12 (Fig. 31), while at the bottom, the trimmer member 24 preferably rests upon the floor with the tongue 26 engaging the rear side of the upright member and having the shelf board 12 bearing upon the upper edge of the rib 25 (Fig. 30).

The modified form of spreader, shown in Fig. 27 and in assembly Fig. 29, is preferably provided with a vertically disposed notch or recess 27 located in the end portion of said spreader parts or member.

The function of the recess or notch 27 of this form of spreader member having paired parts 45 is to engage the tongue 26 of the front trimming member 24 as shown in Fig. 29.

Where the shelving is to start substantially on the floor, preferably a base block 28 (see Fig. 17) is provided, said block is provided with grooves 29 to receive tongues 10 of the modified form of the spreader shown in Fig. 7 or tongues 10 of the modified form of the spreader member shown in Fig. 29. This base block is shown in position in Figure 1 and Fig. 18.

If it is desired to have the first shelf located somewhat above the floor level, then a pedestal block 30 (Figs. 16 and 18) may be employed having a tongue 31 receivable by the groove 2 of the upright 1. In this case the base block 28 is located on top of the pedestal block 30, as shown in Fig. 18.

Figure 11:
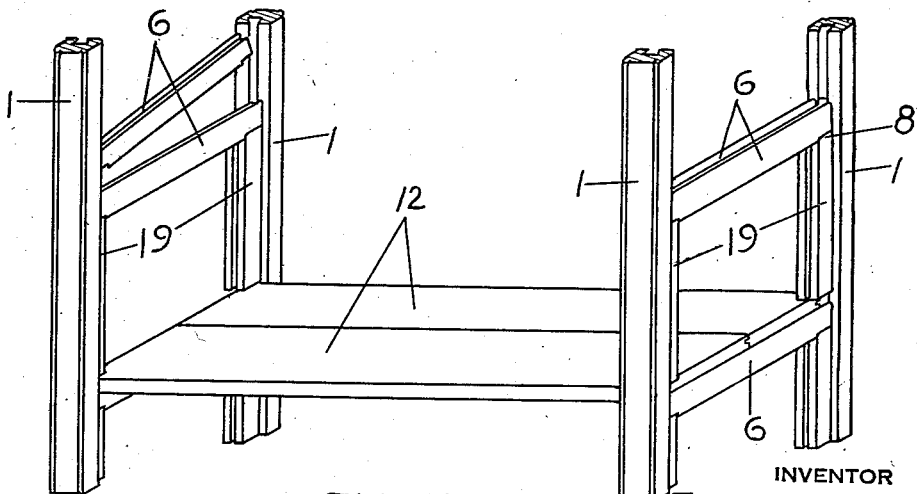
Fig. 11 is a view in perspective of the assembly of Fig. 10 with the spreader members added and in process of being added.

The function of the notch 8 of the form of the spreader shown in Fig. 4 is to engage and hold in position the spacer 19 as shown in Fig. 11.

Figure 19:
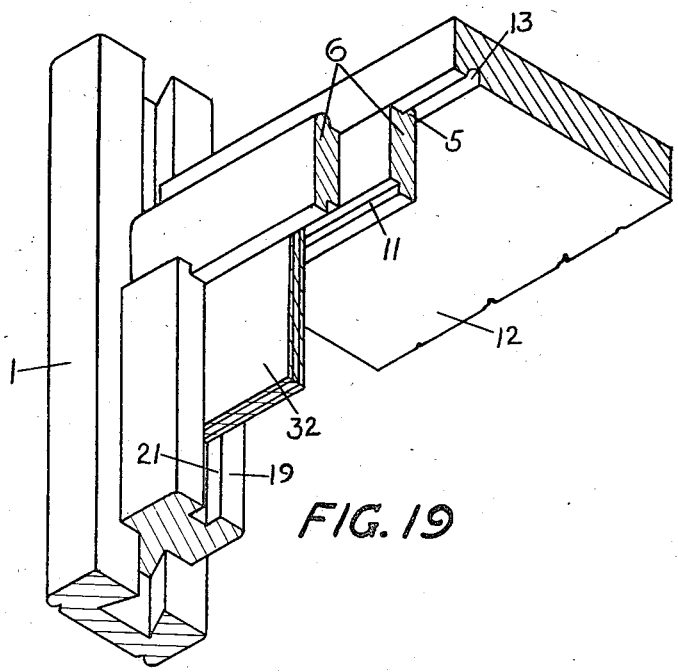
Fig. 19 is an enlarged fragmentary view in perspective showing the assembly of upright, spacer, end partition, spreader, and shelf board members.
Figure 20:
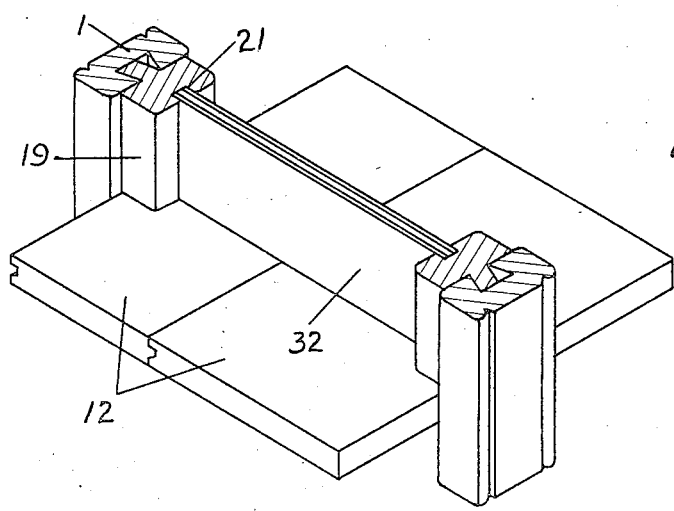
Fig. 20 is a view from above showing the assembly of two upright members, spacer, end partition, and shelf board members.
Figures 24, 25:
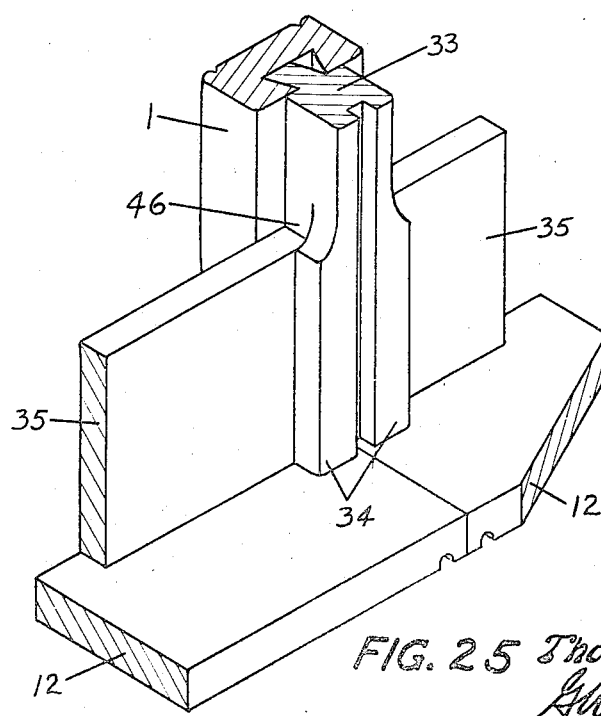
Fig. 24 is a view in perspective of a modified form of spacer member.
Fig. 25 is a fragmentary enlarged view of the assembly of the modified form of spacer member with front bin boards, upright member and shelf board members.

The function of the groove 11 of the modified forms of the spreader member shown in Figs. 7 and 29 is to receive and hold an end partition member 32 shown in Figs. 19 and 20. One of the functions of the groove 21 of the spacer 19 is to retain the end partition member 32 as shown in Figs. 19 and 20. A modified form of spacer is shown in Fig. 24, wherein the spacer 33 is providel with flanges 34 on each rear side thereof, so as to provide a groove 46 between the said flanges 34 and a portion of the rear face of the upright 1 (Fig. 25). This groove 46 retains a bin front 35.

Figure 21:
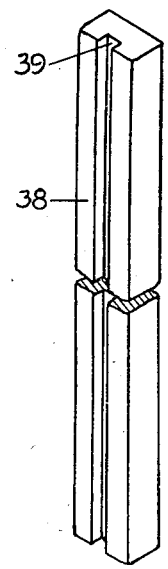
Fig. 21 is a view in perspective of a channel member.
Figure 22:
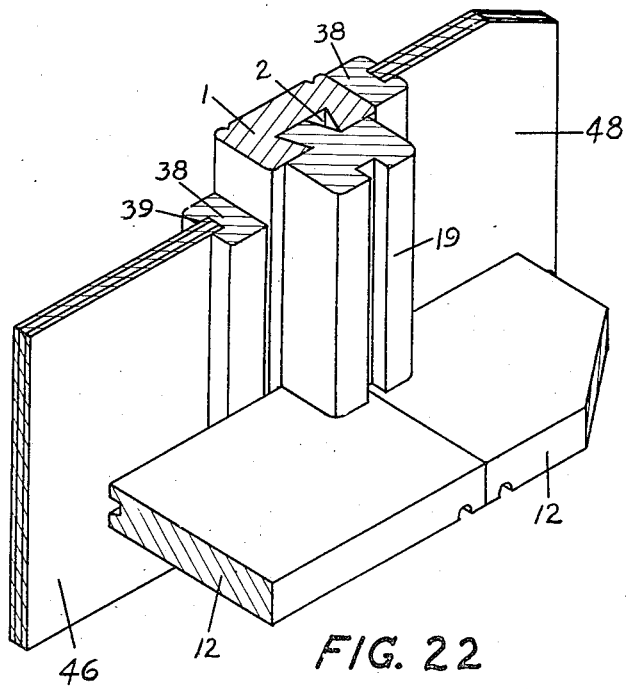
Fig. 22 is an enlarged fragmentary view in perspective of the assembly of the back-lining, channel, upright, spacer, and shelf board members.
Figure 23:
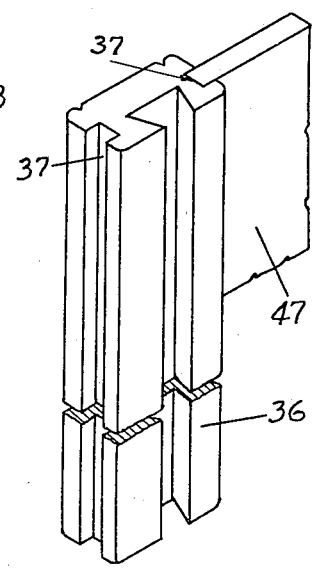
Fig. 23 is a view in perspective of a modified form of upright member.

In the modified form of the upright shown in Fig. 23 lateral grooves 37 are provided in the upright 36 to provide a retaining means to receive a back lining 47. If it is desired to add a back lining to a shelving having upright members of the form shown in Fig. 3, a channel member 38 (Fig. 21) may be secured to the sides of said upright member by gluing or tacking, said channel member having a groove 39 to provide a retaining means for the back lining 48 (Fig. 22).

Figure 33:
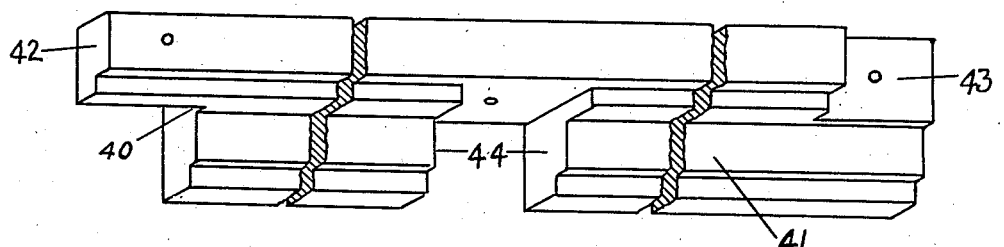
Fig. 33 is a view in perspective of a modified form of front trim member.

In Fig. 33 a modified form of a front trimming member 41 is shown having a longitudinal recess 40 in its rear side to make a fitting with a shelf member 12 (Fig. 34). This trimming member 41 is preferably provided with lap-joint parts 42 and 43, and may be secured in position by wood screws extending through said lap-joint parts and into the edge of the shelf member 12. Also, said trimming member 41 is provided with notch portions 44 to receive therein upright member 1. Fig. 34 also shows how a ledge type or counter type of shelving is constructed having upright members 1 resting on shelf boards 12.

The above parts of the shelving embodying my invention manifestly may be machine made and may be provided in packages of any desired number of parts to form a shelving section of any desired shelving space, or capacity and any sections may be ordered as may be required and may be added to by ordering subsequent packages of shelving as requirements may dictate. The above parts being provided in disassembled form are accorded a very low freight rate and thereby it is made possible to provide shelving most economically. Since the preferred form of shelving may be assembled substantially without any nailing or other securing means, it is manifest that the same may be disassembled and moved as occasion may require, without damage to the shelving and therefore all waste avoided.

Furthermore, another feature contributing materially to the economic construction of the shelving embodying my invention resides in the fact that all the supporting parts are of a cross sectional area less than standard lumber dimensions, whereby the said shelving may be largely constructed of waste material of the ordinary mill. Any pieces of lumber under a 2 x 4 or a 1 x 4 is considered waste material in the soft wood industry.

Obviously, changes may be made in the forms, dimensions and arrangement of the parts of my invention, without departing from the principle thereof, the above setting forth only preferred forms of embodiment.

I claim:

1. A shelving embodying: two uprights oppositely disposed, having a dove-tail retainer groove in a longitudinal face of each; a spreader having (a) a dove-tailed tongue on each end portion of a form receivable by said groove in the uprights, said spreader thereby securing said uprights in spaced apart relation, and (b) a longitudinal tongue along each side of the upper edge; shelf members having a transversely disposed groove on the underside in each end portion disposed to engage one of the longitudinal tongues of said spreader, the ends of said shelf members being held in abutting relation by the said longitudinal tongues along each side of the upper edge of said spreader; and a spacer member having a longitudinal tongue on one side disposable in the groove of said upright.

2. A shelving embodying: an upright having a retainer groove in one longitudinal face; a spreader having (a) a tongue on each end portion of a form receivable by said groove in the upright, and (b) a longitudinal tongue along each side of the upper edge; a shelf member having a transversely disposed groove on the underside in each end portion disposed to engage one of the longitudinal tongues of said spreader; a spacer member having a longitudinal tongue on one side disposable in the groove of said upright; and a shelf end trimming member of an inverted J form cross-sectionally considered, the hook of the J being engageable with a longitudinal tongue of the spreader.

3. A shelving embodying: a front trimming member having a rib disposed centrally along the back of said trimming member, and end tongues projecting beyond the ends of said trimming member, and an upright, the lateral portions of which abut against one of the tongues of said trimming member.

4. In a wooden shelving having an upright and a shelf member of the character described, a spreader formed in two or paired parts, each of which has (a) a tongue on each end portion, (b) a convex-like surface on adjoining faces, and (c) a longitudinal tongue disposed on the top edge.

5. In a wooden shelving having an upright and a shelf member of the character described, a spreader formed in two or paired parts, each of which has (a) a tongue on each end portion, (b) a convex-like surface on adjoining faces, (c) a longitudinal tongue disposed on the top edge, and (d) a notch on the underside in the end portion.

6. In a wooden shelving, an upright having a longitudinal dove-tail retainer groove in a longitudinal face thereof; a spacer member having a longitudinal tongue angularly disposed to the face of the spacer member cross sectionally considered, the angle formed corresponding to the angle of the lateral walls of the dove-tail groove, whereby said spacer member may be placed directly in position intermediate the length of said upright member; and a spreader member having a tongue engageable within the said upright dove-tail retainer groove, said spreader member having a spacer member retaining portion engageable with said spacer member.

7. In a wooden shelving having an upright and a shelf member of the character described, a spacer member having a longitudinal tongue on one side and a longitudinal flange disposed on each side opposite and at right angles to said tongue for a portion of the length of said spacer member, whereby bin front members may be held.

8. In a wooden shelving, an upright member provided with a longitudinal tongue receiving groove, said groove having means upon the vertical walls forming the groove, engageable with and resisting removal of tongue means interfitted in said groove therefrom through said groove; a spreader member formed of two parts; a tongue member disposed on an end portion of one of said spreader parts and adapted to interfit within a portion of the groove in the upright member; and another tongue member disposed on an end portion of the other of said spreader parts and adapted to interfit with the remaining portion of the groove in the upright member whereby the tongue members on said spreader member may be interposed in said longitudinal tongue receiving groove intermediate the length thereof and said groove will retain said tongue members and will resist horizontal withdrawal of the tongue members from the groove.

9. In a wooden shelving, an upright member provided with a longitudinal tongue receiving groove, said groove having means upon the vertical walls forming the groove, engageable with and resisting removal of tongue means interfitted in said groove therefrom through said groove; a spreader member formed of two parts; a tongue member disposed on an end portion of one of said spreader parts and adapted to interfit within a portion of the groove in the upright member; another tongue member disposed on an end portion of the other of said spreader parts and adapted to interfit with the remaining portion of the groove in the upright member whereby the tongue members on said spreader member may be interposed in said longitudinal tongue receiving groove intermediate the length thereof and said groove will retain said tongue members and will resist horizontal withdrawal of the tongue members from the groove; and a longitudinal shelf supporting tongue disposed on the top edge of each of said spreader parts.

10. In a wooden shelving, an upright member provided with a longitudinal full dove-tail tongue receiving groove; a spreader member formed of two paired parts; a half dove-tail tongue member disposed on an end portion of each of said paired spreader parts and adapted to interfit within one half of the full dove-tail tongue receiving groove in the upright member; and a longitudinal shelf supporting tongue disposed on the top edge of each of said spreader parts.

THOMAS E. HEPPENSTALL.